Feb. 2, 1926.　　　　　　　　　　　　　　　　　1,571,426
M. B. MITCHELL
COLLAPSIBLE BED AND TENT FOR AUTOMOBILES
Filed Sept. 14, 1923　　　3 Sheets-Sheet 1
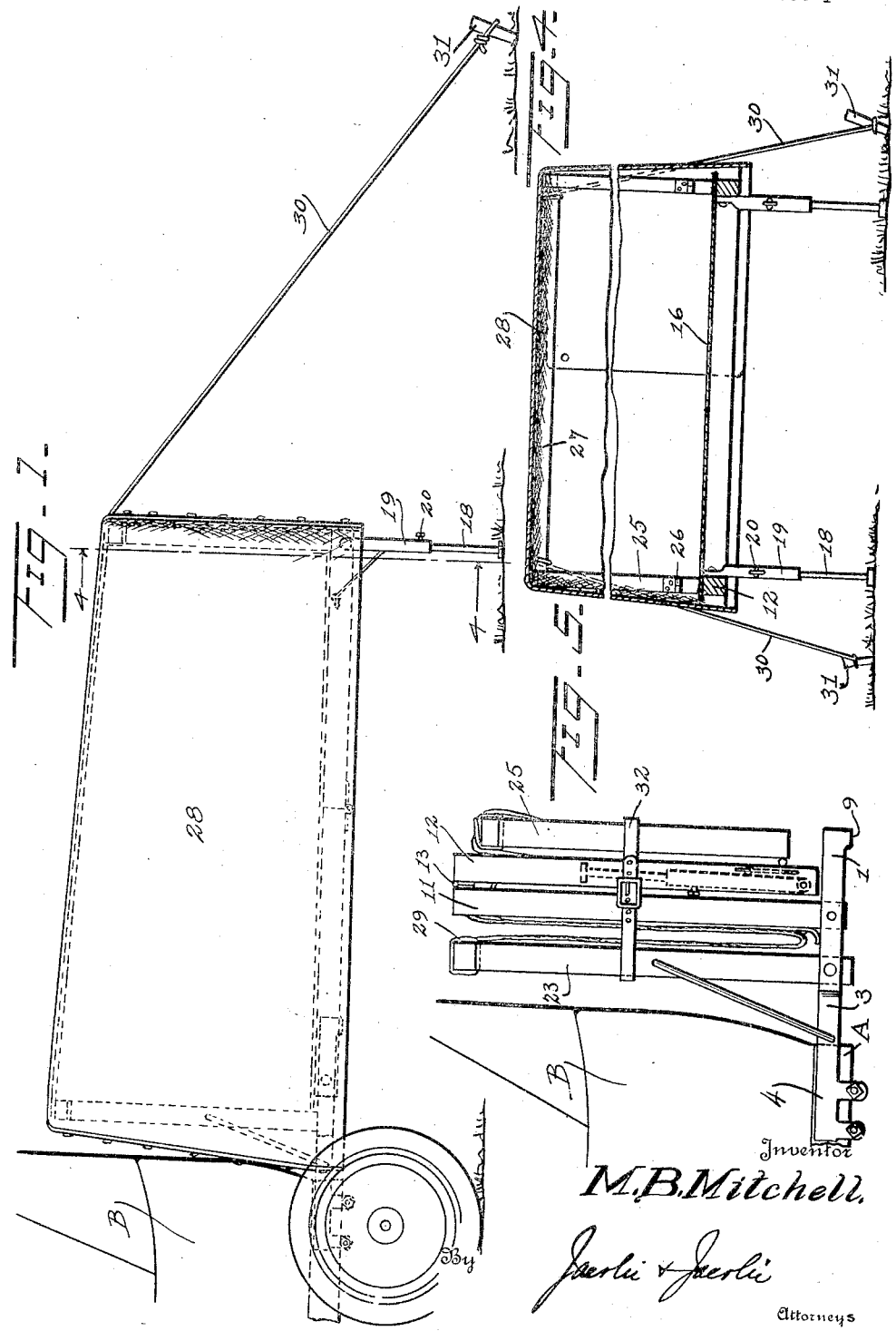
Inventor
M.B.Mitchell,
By Joerlii & Joerlii
Attorneys

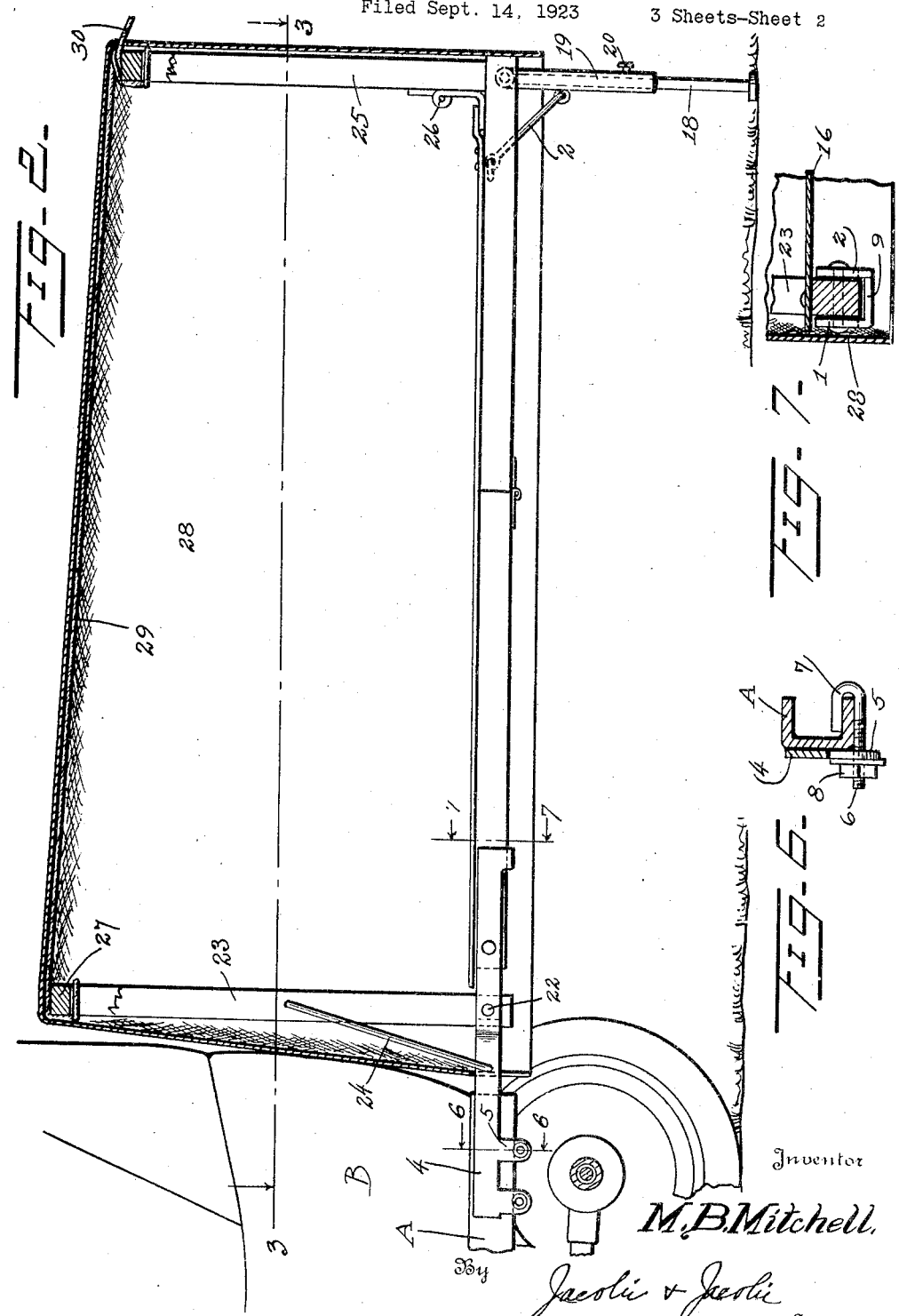

Feb. 2, 1926.
M. B. MITCHELL
1,571,426
COLLAPSIBLE BED AND TENT FOR AUTOMOBILES
Filed Sept. 14, 1923   3 Sheets—Sheet 3
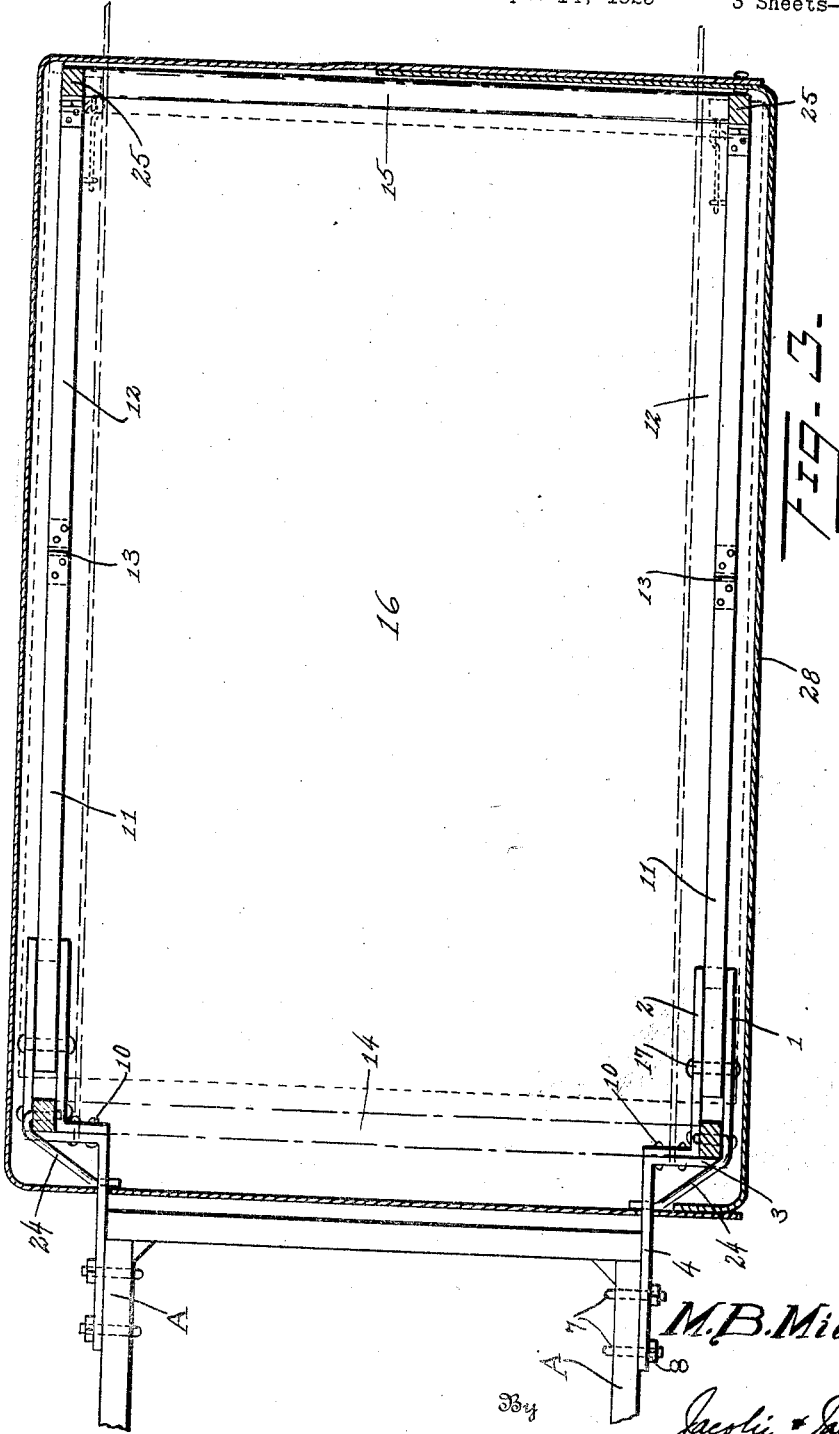

Patented Feb. 2, 1926.

1,571,426

UNITED STATES PATENT OFFICE.

MARK B. MITCHELL, OF SPRING PRAIRIE, WISCONSIN.

COLLAPSIBLE BED AND TENT FOR AUTOMOBILES.

Application filed September 14, 1923. Serial No. 662,707.

*To all whom it may concern:*

Be it known that MARK B. MITCHELL, a citizen of the United States, residing at Spring Prairie, in the county of Walworth and State of Wisconsin, has invented certain new and useful Improvements in Collapsible Beds and Tents for Automobiles, of which the following is a specification.

This invention relates to a new and useful improvement in collapsible beds and tents for automobiles wherein the device can be readily set up in position whenever desired to be used and may be furthermore so collapsed or folded as to occupy a minimum amount of space and be easily removed from the rear of the automobile upon which the same is mounted.

Another important object of the invention is to provide a collapsible bed and tent of the above mentioned character, wherein means is provided for adjustably supporting the bed in a horizontal extended position and additional means being provided for preventing the accidental lowering of the bed frame below a predetermined heighth.

A further object of the invention is to provide a collapsible bed and tent which is supported upon suitable brackets, the latter being adapted for detachable connection with the frame of the automobile, and each bracket being arranged so as to extend outwardly and rearwardly of the frame of vehicle so as to permit the bed and tent to be readily folded up when not in use.

An equally important object of the invention is to provide a collapsible bed and tent of the above mentioned character which is of such a construction as to permit the same to be assembled in an operative position in a quick and efficient manner and which does not require the necessity of employing a number of complicated tools in order to set the device in position.

A further object of the invention is to provide a collapsible bed and tent which may be used for various purposes when set up in position and is especially useful in camping or when touring.

A still further object of the invention is to provide a collapsible bed and tent of the above mentioned character, which is simple in construction, inexpensive, strong and durable and further well adapted for the purposes for which it is designated.

Other objects and advantages of this invention will become apparent during the course of the following description.

In the accompanying drawings forming a part of the specification and in which like numerals designate like parts throughout the same.

Figure 1 is a side elevation of my device applied to a motor vehicle.

Figure 2 is a longitudinal sectional view thereof.

Figure 3 is a horizontal section taken on line 3—3 of Figure 2.

Figure 4 is a transverse section taken on line 4—4 of Figure 1.

Figure 5 is a side elevation showing the device in a folded position.

Figure 6 is a detail sectional view taken on line 6—6 of Figure 2, and

Figure 7 is a similar view taken on line 7—7 of Figure 2.

In the drawings wherein for the purpose of illustration is shown the preferred embodiment of my invention, the numerals 1 and 2 designate the complimentary parts of a suitable bracket which is supported on each side of the frame A of the vehicle B in the manner as will hereinafter be more fully described. Each bracket is provided with a rearwardly extending portion shown at 4 in the drawings and the rearwardly extending portion is provided adjacent its outer end with downwardly extending portions shown at 5. The purpose of these downwardly extending portions 5 is to provide a means for receiving the threaded portion 6 of a suitable clamping bolt 7 the inner end of which is adapted to engage the angle irons forming the frame and whereby a nut 8 is adapted to be threaded upon the free ends of the bolt so as to permit the bracket to be detachably supported upon the sides of the frame A in the manner as clearly shown in Figures 3 and 6 of the drawings.

The complimentary parts 1 and 2 of each bracket extend rearwardly of the vehicle frame and body and the outer ends of these complimentary parts are bridged on their under face by a suitable strip shown at 9 in the drawings and forming a part of one of the sections or parts whereby a substantially U-shaped arm is formed on the inner end of each bracket as clearly shown in Figure 7 of the drawings. As clearly shown in Figure 3 of the drawings the part or section has its inner end secured to the bracket 3 by any suitable fastening means such as is shown at 10 in the drawings.

The complimentary sections 1 and 2 of these brackets are adapted to pivotally support therebetween the outer ends of the side bars 11 which are hingedly connected to the side bars 12 through the medium of hinges 13, the side bars 11 adapted to form what I term as the head section while the side bars 12 provide the foot section. These side bars 11 and 12 respectively are connected at their outer free ends by means of the transverse bars 14 and 15 respectively. In this manner a complete bed frame is formed and a suitable strip of canvas such as shown at 16 in the drawings is adapted to extend between the side bars 11 and 12 and is secured thereto at its respective ends in such a manner as to permit the same to be readily turned up to form a seat. If desired, a set of folding springs may be used in place of the strip of canvas.

The head section has its side bars 11 extending into the U-shaped portions formed by the complimentary sections 1 and 2 of the brackets 3 and is pivotally supported therein by means of a transverse pin 17. The transverse strip 9 provides a means for limiting the downward movement of the side bar and to furthermore support the outer end or foot section of the bed frame, I provide the adjustable supporting legs 18 which are slidable in the cylinders 19, the latter being pivotally supported on the inner side of the side bars 12 adjacent the transverse bar 15. A suitable adjusting screw shown at 20 in the drawings being provided for holding the supporting legs 18 in various adjusted positions within the cylinders 19. To furthermore assure the supporting legs against accidental displacement suitable bracing means such as is shown at 21 in the drawings extend between the cylinders 19 and the side bars 12. In this manner the supporting legs 18 may be adjusted to the proper height so as to enable the bed spring to extend in a substantially horizontal position when in use.

Extending upwardly from each of the brackets and supported between the complimentary sections 1 and 2 thereof by means of the supporting pins 22 are the uprights or standards 23. These standards 23 are so positioned with respect to each of the brackets as to be arranged in spaced relation with the rear of the body of the car B and for normally holding the same in an upright position, I provide the auxiliary bracing element shown at 24 in the drawings. Similar uprights or standards 25 are hingedly mounted upon the upper faces of the outer ends of the side bars 12 as shown at 26 in Figure 2 of the drawings. The uprights 23 and 25 are also provided at their upper ends with transversely extending cross bars 27 which forms a rigid structure. It being further understood that the uprights 23 extend a slight distance above the uprights 25.

A suitable covering of canvas shown at 28 is adapted to extend over the sides and top of the uprights which form a canopy supporting frame and to furthermore prevent the top of the canopy from hanging downwardly between the two pairs of uprights I provide between the transverse cross bars 27 the central supporting rope 29. To furthermore aid in holding the uprights 25 in their supported position, suitable cables 30 are connected to the cross beams 27 extending across the upper ends of the uprights 25 and the opposite ends of these cables are fastened to suitable stakes 31 which are driven in the ground as clearly shown in Figures 1 and 4 of the drawings.

With the parts arranged as shown in Figures 1, 2, 3 and 4 of the drawings, the device is ready for use for any desired purpose such as a bed, table and the like. When it is desired to fold the device into an inoperative position, when not in use, the stakes 31 are removed from the ground and the supporting legs 18 are swung upwardly so as to extend parallel and adjacent the inner sides of the side bars 12. The hinged section 12 which forms the foot section is then swung back upon the head section so that when the head section has its side bars 11 raised upwardly on the pivot pins 17 in the brackets 3, the side bars of both the head and foot sections will extend substantially parallel to each other. In a similar manner the supporting uprights 23 and 25 will extend vertically in parallel relation with the side bars 11 and 12 and the canopy 28 will of course have been folded so as to permit a suitable strap or the like shown at 32 in the drawings to extend around the folded sections whereby the same are held in a collapsed position and prevent accidental movement. This arrangement is clearly shown in Figure 5 in the drawings.

When folded as shown in Figure 5 my device will be supported upon the brackets 3 in such a manner as to take up a minimum amount of space and at the same time provide a space between the rear of the automobile body B and the uprights 23 for the reception of various articles and also the canopy 28 when not in use. If desired a suitable covering or the like may be placed over the folded parts so as to present a neat appearance when the automobile is in movement.

With a device of the above mentioned character, it will be seen that a collapsible bed and tent for automobiles has been provided which is especially useful by tourists while traveling and camping. Furthermore the construction of my device enables the same to be easily and quickly set up in position for use whenever desired and will provide a rigid structure which is not apt to become collapsed accidentally. Any suitable material may be used in constructing my device and in the present instance I have shown the use of angle iron and wood in the formation of the various parts, it being further understood that the entire device when folded will not add any considerable weight to the car or otherwise interfere with access to any parts of the vehicle body or frame.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:—

In a device of the class described, a folding bed and tent comprising a frame including head and foot sections hingedly connected together, brackets carried by the frame of an automobile and extending rearwardly therefrom, the forward ends of said brackets being U-shaped in cross-section and adapted to support the side bars of the head section of said frame, the aforesaid U-shaped portions of said brackets having their inner sides bent to form L-shaped supports, said last mentioned side bars being pivotedly connected to said brackets, vertical standards secured to said brackets, bracing means between said standards and brackets, additional standards pivotally supported at the outer ends of the foot section of said frame, a canopy adapted to extend over said standards and supporting means for the foot section of said frame comprising a pair of pivoted tubular arms, bars adjustably received in said tubular arms and diagonal bracing elements between the frame and said arms, substantially as described.

In testimony whereof I affix my signature.

MARK B. MITCHELL.